U.S. Patent Office
3,480,672
Patented Nov. 25, 1969

3,480,672
PROCESS FOR REDUCTION OF NITRO COMPOUNDS TO CORRESPONDING OXIMES AND KETONES
Ehrenfried H. Kober and Gerhard F. Ottmann, Hamden, and Haywood Hooks, Jr., West Haven, Conn., assignors to Olin Mathieson Chemical Corporation, a corporation of Virginia
No Drawing. Filed Mar. 28, 1967, Ser. No. 626,428
Int. Cl. C07c *131/00, 45/00*
U.S. Cl. 260—566                          8 Claims

ABSTRACT OF THE DISCLOSURE

A process for preparing oximes and ketones in which a primary or secondary nitro compound is caused to react with carbonyl sulfide in the presence of a base and at elevated temperatures and pressures.

---

This invention relates to a new process for the production of oximes and ketones. More particularly, this invention relates to a highly economic process for obtaining oximes and ketones in which carbonyl sulfide is utilized as a reducing agent.

The importance of the oximes in the organic chemical industry is well known. For example, cyclohexanone oxime is utilized as an intermediate in the preparation of caprolactam. Generally, caprolactam is produced by the Beckmann rearrangement of the oxime and a number of processes for accomplishing this operation are known.

The commercial production of oximes has, for the most part, been by processes where ketone compounds are reacted with hydroxylamine salts and the like or where primary or secondary nitro compounds or salts of such nitro compuonds are catalytically reduced. Because of the high cost, contamination of product, etc., the prior processes are unattractive economically.

One of the objects of this invention is to provide an improved process for oximes and ketones. Another object is to provide an efficient process with low yield of undesired by-products. A still further object is to provide a process for the conversion of nitro compounds to useful products wherein cheap, readily-available reactants can be employed. Other objects of the invention will become apparent from the description of the invention.

It has been found that the foregoing objects may be achieved when a primary or secondary nitro compound is reacted with carbonyl sulfide in the presence of a base under conditions of elevated temperature and pressure.

The carbonyl sulfide employed in the process of this invention is available from a number of sources at low cost. For example, large quantities of by-product carbonyl sulfide are produced in the cellulose industries.

Surprisingly, in the process of this invention the nitro compound is converted largely to the oxime. At times, however, depending on how the reaction is carried out, a minor amount of the corresponding ketone may be formed. For example, in preparing cyclohexanone oxime from nitrocyclohexane by the process of this invention, cyclohexanone may be present in the final reaction mixture. The ketone can be converted to the oxime by treating the reaction mixture with hydroxylamine. Alternatively, the oxime and the ketone can be separated, such as by aqueous acid extraction, to remove the oxime from the ketone as a water-soluble salt.

In the novel process of this invention, the total pressure utilized will vary from about 100 to 10,000 p.s.i.g. Preferably, the total pressure is between 250 and about 1000 p.s.i.g. Although pressures below about 100 p.s.i.g. are operable, only low yields are obtained over long periods of time. Higher pressures, which require expensive and elaborate processing equipment are not needed to obtain high yields. The temperature under which the reaction is conducted may be varied and usually will range from about 100 to about 250° C. and preferably will be from about 120 to about 220° C. Excessive decomposition results if temperatures above 250° C. are employed.

The reaction time will vary over a wide range and is dependent upon the processing conditions employed as well as a particular nitrocycloalkane compound being reacted. Usually between about 0.5 to about 30 hours are required to obtain a satisfactory degree of reaction, however, shorter or longer reaction times may be employed.

Primary and secondary nitro compounds useful as starting materials in the process of this invention include nitroalkanes, such as nitroethane, 1 - nitropropane, 2 - nitropropane, 1-nitro-3-methylpropane, 1-nitrobutane, 2-nitro-3-ethylbutane, 1-nitropentane, 2-nitro-4-methylpentane, 1-nitrohexane, 2-nitrohexane, 3-nitro-4,5-dimethylhexane, 3-nitrododecane, 5 - nitro-7,8-diethyloctadecane, etc., and nitrocycloalkanes, such as nitrocyclopentane, nitromethylcyclohexane, nitrocyclohexane, nitrocyclheptane, nitrocyclooctane, nitrocyclodecane, etc. and mixtures thereof. Generally, the nitro compounds useful as starting materials will contain between about 2 and about 20 carbon atoms and preferably between 2 and about 10 carbon atoms.

The exact role of the base in this process is not completely known. The useful base compounds include, for example, alkali metal hydroxides, such as sodium hydroxide, potassium hydroxide, lithium hydroxide; alkali metal carbonates, such as sodium carbonate, potassium carbonate and lithium carbonate; alkali metal alkoxides, such as sodium methoxide, potassium ethoxide, potassium tertiary butoxide, lithium propoxide and alkali metal salts of phenols such as sodium phenoxide, etc. Mixtures of the above-mentioned bases can be utilized, if desired. The quantity of the base compound utilized may be varied over a wide range and generally will be from about 0.1 to about 2.0 moles per nitro group of the starting nitro compound.

The order of mixing of the reactants is not critical and may be varied widely according to the limitations of the equipment employed. In carrying out the reaction at superatmospheric pressure in suitable pressure vessels such as an autoclave or high pressure continuous flow system, the carbonyl sulfide under pressure may be fed directly into the autoclave or tubular reactor.

A wide variety of apparatus can be employed in conducting the process described herein. For example, rocking-type as well as stirred autoclaves and tubular reactors may be employed. Preferably, some form of agitation, such as stirring, is supplied even when operating at low pressures. The process can be carried out batchwise, semi-continuously or continuously, as desired.

Continuous flow systems can be advantageously employed, especially where the reaction is carried out under conditions which will cause turbulent flow at Reynolds numbers of from about 5000 to about 100,000 and preferably in the range between about 10,000 to about 100,000. Any suitable method of carrying out mixing which will give this Reynolds number is satisfactory. Generally, a continuous flow reactor constructed of steel tubing of small diameter, such as a quarter inch inside diameter, through which the reactants are forced can be operated with conventional high-pressure pumping equipment to produce the required high state of turbulence in the mixing zone. Jacketed tubing may be provided to cool or heat the reaction mixture, as required, and suitable valves are present so that the turbulent reaction mixture may be continuously drawn off to a separation unit such as a filter, where any solids present are removed. The reaction mixture is then sent to a recovery unit, which can consist of appropriate distillation or extraction units for recovery of the products.

Carbonyl sulfide can be fed into the reactor or reaction system either intermittently or continuously as the reaction progresses. The total amount of carbonyl sulfide added during the reaction generally will be between about 0.3 and about 50 moles and, preferably, between about 2 and about 20 moles per mole of the starting nitro compound. If desired, greater or lesser amounts may be utilized. Unreacted carbonyl sulfide may be recycled to the reaction system to reduce the overall consumption and increase the efficiency of the process.

The carbonyl sulfide utilized as a reactant in this invention may be introduced into the reaction system as a gas or a liquid. Although usually in carrying out the process of this invention the pressure required is achieved through the use of the carbonyl sulfide alone, if desired, a mixture of carbonyl sulfide and an inert diluent gas, such as nitrogen may be employed. An inert diluent gas is one which is inert to all constituents of the reaction mixture under reaction conditions.

This process can also be conducted in the presence of an organic solvent, which can be, for example, a hydrocarbon solvent, such as benzene, toluene, xylene, etc., nitrocyclohexane, etc. The quantity of the particular solvent employed is not critical and can be varied over a wide range.

The following examples, which illustrate a specific embodiment of the invention, are to be considered not limitative:

EXAMPLE I

A rocking-type autoclave, which had been previously cooled to about −30° C., was charged with 20 g. of nitrocyclohexane, 45 g. of carbonyl sulfide, and 5 g. of potassium hydroxide under anhydrous conditions and under a nitrogen blanket. The autoclave was closed and slowly heated to 150° C. whereby a pressure of 500 p.s.i.g. built up. The temperature of the autoclave was maintained at 150° C. for an additional hour after which it was allowed to cool to room temperature. Next, the autoclave was opened and the reaction mixture filtered to remove the small amount (5 g.) of solids which were present. The unreacted carbonyl sulfide was removed in vacuo following which the reaction mixture was distilled at a pressure of about 0.1 mm. Hg and the volatile products were collected in a receiver cooled to about −80° C. with Dry Ice.

Analysis of the liquid product by infrared, mass spectroscopy, and vapor phase chromatography methods indicated that the reaction mixture contained 26 percent by weight of cyclohexanone oxime and 12 percent by weight of cyclohexanone. The corrected yield of cyclohexanone oxime was 54 percent based on a 55 percent conversion of nitrocyclohexane.

EXAMPLE II

In this example the same apparatus and identical quantities of the same reactants employed in Example I were utilized except that the potassium hydroxide was replaced with sodium methoxide. The reaction was conducted under the same operating conditions as in the previous example.

Analysis of the volatile portion of the reaction product by infrared, mass spectroscopy, and vapor phase chromatographic methods indicated that a substantial quantity of cyclohexanone oxime was present.

What is claimed is:

1. A process for the production of a material selected from the group consisting of an oxime, a ketone, and mixtures thereof, which comprises reacting a nitro compound selected from the group consisting of primary nitroalkanes, secondary nitroalkanes and nitrocycloalkanes, with carbonyl sulfide in the presence of a base, said base being selected from the group consisting of alkali metal hydroxides, alkali metal carbonates, alkali metal alkoxides, alkali metal salts of phenols and mixtures thereof, under anhydrous conditions at a pressure in the range between about 100 and about 10,000 p.s.i.g. and at a temperature in the range of between about 100 and about 250° C., the quantity of said base being from about 0.1 to about 2.0 moles per nitro group of said nitro compound.

2. The process of claim 1 wherein said alkali metal is sodium.

3. The process of claim 1 wherein said alkali metal is potassium.

4. The process of claim 1 wherein said alkali metal is lithium.

5. The process of claim 1 wherein said nitro compound is nitrocyclohexane.

6. The process of claim 5 wherein said base is an alkali metal hydroxide.

7. The process of claim 6 wherein said alkali metal hydroxide is potassium hydroxide.

8. The process of claim 5 wherein said base is sodium methoxide.

References Cited

UNITED STATES PATENTS

| | | |
|---|---|---|
| 2,709,179 | 5/1955 | Ottenheym. |
| 2,763,686 | 9/1956 | Donaruma. |
| 2,945,065 | 12/1960 | Donaruma. |

OTHER REFERENCES

Ferm: "Chem. Revs." vol. 57, pp. 622 to 623, 627 to 633, and 636 to 640 (1957).

LEON ZITVER, Primary Examiner

M. M. JACOB, Assistant Examiner

U.S. Cl. X.R.

260—593, 586